(12) United States Patent
Segi et al.

(10) Patent No.: US 8,655,128 B2
(45) Date of Patent: Feb. 18, 2014

(54) OPTICAL FIBER BUNDLE AND OPTICAL IRRADIATOR

(75) Inventors: Takeshi Segi, Sakura (JP); Keiji Kaneda, Sakura (JP); Tomonori Yokota, Sakura (JP); Masanobu Hidaka, Chuo-ku (JP)

(73) Assignee: Fujikura Ltd., Tokyo (JP)

( * ) Notice: Subject to any disclaimer, the term of this patent is extended or adjusted under 35 U.S.C. 154(b) by 449 days.

(21) Appl. No.: 12/532,364

(22) PCT Filed: Mar. 21, 2008

(86) PCT No.: PCT/JP2008/055323
§ 371 (c)(1),
(2), (4) Date: Mar. 12, 2010

(87) PCT Pub. No.: WO2008/114869
PCT Pub. Date: Sep. 25, 2008

(65) Prior Publication Data
US 2010/0176311 A1   Jul. 15, 2010

(30) Foreign Application Priority Data

Mar. 22, 2007  (JP) .................................. 2007-075071
Mar. 22, 2007  (JP) .................................. 2007-075082

(51) Int. Cl.
*G02B 6/04*   (2006.01)
(52) U.S. Cl.
USPC .............................. 385/115; 385/116; 385/43
(58) Field of Classification Search
USPC .......................................................... 385/43
See application file for complete search history.

(56) References Cited

U.S. PATENT DOCUMENTS 3,933,455 A     1/1976  Chown
4,360,372 A  * 11/1982  Maciejko ......................... 65/402
4,815,816 A  *  3/1989  Schneider ...................... 385/116
(Continued)

FOREIGN PATENT DOCUMENTS

JP   50-055345 A   5/1975
JP   50-137551 A  10/1975
(Continued)

OTHER PUBLICATIONS

Communication dated Nov. 30, 2011 from the Korean Intellectual Property Office in counterpart Korean application No. 10-2009-7021893.

(Continued)

*Primary Examiner* — Hemang Sanghavi
(74) *Attorney, Agent, or Firm* — Sughrue Mion, PLLC

(57) ABSTRACT

For an enhanced coupling efficiency between a light source and an optical fiber bundle: the optical fiber bundle is made up by a dense bundle of optical fibers, with an integrated portion composed of fusion-integrated distal ends of the bundled optical fibers, and the integrated portion has, in a longitudinal sectional plane along a center axis of the optical fiber bundle, a lateral side thereof formed, in a shape of arc radially outwardly convex with respect to a straight line interconnecting an end point at a front end face side of the integrated portion and an end point at a rear end side thereof, to locate at a radially inner side with respect to an extension toward the integrated portion of a line constituting an outline of a portion else than the integrated portion of the optical fiber bundle.

26 Claims, 16 Drawing Sheets

(56) References Cited

U.S. PATENT DOCUMENTS

| | | | |
|---|---|---|---|
| 4,932,747 A * | 6/1990 | Russell et al. ............... 385/115 |
| RE33,722 E * | 10/1991 | Scifres et al. ................ 385/33 |
| 7,197,217 B1 * | 3/2007 | Voyagis et al. ............. 385/115 |
| 7,250,611 B2 * | 7/2007 | Aguirre et al. ............. 250/461.1 |
| 7,460,755 B2 * | 12/2008 | Bruesselbach et al. ....... 385/116 |
| 2003/0147254 A1 | 8/2003 | Yoneda et al. |
| 2003/0193817 A1 | 10/2003 | Yoneda et al. |
| 2006/0257083 A1 * | 11/2006 | Rasmussen ................ 385/115 |
| 2008/0050069 A1 * | 2/2008 | Skovgaard et al. ............ 385/39 |
| 2008/0225550 A1 * | 9/2008 | Sakurada .................... 362/554 |

FOREIGN PATENT DOCUMENTS

| | | |
|---|---|---|
| JP | 02-040603 A | 2/1990 |
| JP | 02-079802 A | 3/1990 |
| JP | 11-084148 A | 3/1999 |
| JP | 11-195828 A | 7/1999 |
| JP | 11-337747 A | 12/1999 |
| JP | 2000-510604 A | 8/2000 |
| JP | 2004-212402 A | 7/2004 |
| JP | 2004-354782 A | 12/2004 |
| JP | 2006-047426 A | 2/2006 |
| JP | 2006-072025 A | 3/2006 |
| JP | 2006-281130 A | 10/2006 |

OTHER PUBLICATIONS

Office Action issued by the Japanese Patent Office in Japanese Application No. 2009-505262 dated Apr. 24, 2012.

Office Action issued by the Korean Patent Office in Korean Application No. 10-2009-7021893 dated Apr. 24, 2012.

* cited by examiner

DISTANCE BETWEEN LIGHT SOURCE AND END FACE D (mm)

1

OPTICAL FIBER BUNDLE AND OPTICAL IRRADIATOR

CROSS REFERENCE TO RELATED APPLICATIONS

This application is a National Stage of International Application No. PCT/JP2008/055323 filed Mar. 21, 2008, claiming priority based on Japanese Patent Application Nos. 2007-075071 and 2007-075082 both filed Mar. 22, 2007, the contents of all of which are incorporated herein by reference in their entirety.

TECHNICAL FIELD

The present invention relates to an optical fiber bundle to be used for transmission of light, and an optical irradiator using the same.

BACKGROUND ART

Optical fiber bundles to be used for transmission of light each include an incidence end formed by a fusion integration of ends of a plurality of optical fibers constituting the optical fiber bundle (refer to the patent document 1, for instance).

Optical fibers constituting such an optical fiber bundle typically have a core made of pure silica glass, and a cladding made of fluoridated silica glass with a smaller refractive index than the core.

Such the optical fibers employing pure silica glass for their cores have small light acceptance angles (numerical apertures) due to limitations on the fabrication method, so they are adapted to transmit no more than rays of light having income at angles within a range of 11 degrees to 14 degrees or near. As a result, for transmission of light radiated from a light source having a greater spread angle than an acceptance angle of optical fibers, the optical fiber bundle had a reduced coupling coefficient with the light source, as an issue.

On the other hand, as a recent trend in industrial fields, there is use of an ultraviolet curing method as a method of curing, among others, adhesives or coating agents. The ultraviolet curing method is a technique of irradiating an ultraviolet curable material with ultraviolet rays for causing a photo-polymerization reaction to change a monomer (liquid) to a polymer (solid).

For the ultraviolet curing method, an ultraviolet irradiator provided with an ultraviolet lamp as a light source has been employed since ever. However, since development of an LED (Light Emitting Diode) adapted to emit ultraviolet rays, there have been practical applications of such an ultraviolet irradiator that uses an ultraviolet LED in place of ultraviolet lamp.

As an ultraviolet irradiator using an ultraviolet LED as a light source, there has been one disclosed in the patent document 2, for instance.

The ultraviolet irradiator disclosed in the patent document 2 has an ultraviolet LED built in an optical irradiation head for projecting ultraviolet rays. Such being the case, placing a light source acting as a heat source as well in an optical irradiation head has constituted a difficulty for the optical irradiation head to be cooled. Moreover, there have been anxieties about raised temperatures of the optical irradiation head, such as by, among others, heat liberation of irradiated objects, and body temperatures of an operator holding the optical irradiation head in the hand during operation.

And, by the rise of temperature of the optical irradiation head, the ultraviolet LED would have accumulated heat, with reduced output power, as an issue.

Patent document 1: Japanese Patent Application Laid-Open Publication No. 2006-72025

Patent document 2: Japanese Patent Application Laid-Open Publication No. 2006-281130

The present invention has been devised in view of the foregoing, so it is an object of the present invention to provide an optical fiber bundle allowing for an enhanced coupling efficiency with a light source.

It also is an object of the present invention to provide an optical irradiator using the above-noted optical fiber bundle and adapted to control light output power against variations due to heat accumulation at a light source.

DISCLOSURE OF INVENTION

To achieve the object described, according to an aspect of the present invention, an optical fiber bundle comprises a bundle of optical fibers, the optical fibers having distal ends thereof integrated together as an integrated portion, the integrated portion being formed in a partial conical shape having a decreasing outside diameter as the integrated portion extends toward a front end thereof.

According to another aspect of the present invention, an optical irradiator comprises one or more light emitting devices configured for emission of light, a propagator configured with incidence ends corresponding to the light emitting devices, for propagation of light incoming from the light emitting devices to the incidence ends corresponding thereto, an output section provided to an end portion at an exit end of the propagator, and configured to collect light from the light emitting devices as propagated by the propagator to externally output, and a heat radiator joined to the light emitting devices, and configured to take therein flux of heat dissipated from the light emitting devices to radiate, the propagator comprising first optical fiber bundles associated with the light emitting devices and bundled as a second optical fiber bundle, the first optical fiber bundles each comprising an optical fiber bundle according to the above-noted aspect of the present invention.

BEST MODE FOR CARRYING OUT THE INVENTION

There will be described below the best modes for carrying out the present invention, with reference to the drawings.

(First Embodiment)

Figure 1:
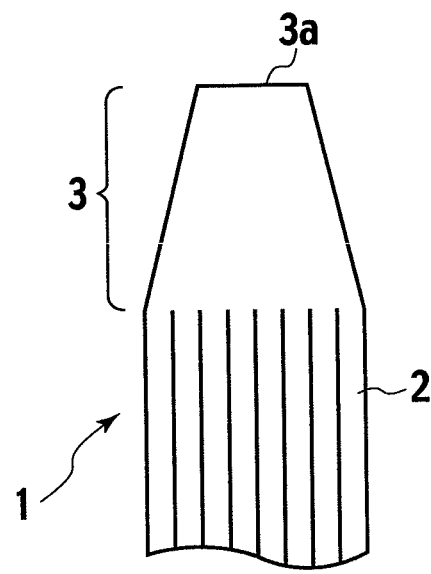
FIG. 1 is a side elevational view of an optical fiber bundle according to a first embodiment of the present invention.

FIG. 1 is a side elevational view of an optical fiber bundle according to a first embodiment of the present invention. As illustrated in FIG. 1, the optical fiber bundle 1 according to the first embodiment is composed of a plurality of optical fibers 2 bundled, regularly or randomly, into a dense bundle, with an integrated portion 3 formed by a fusion integration of distal ends of the bundled plurality of optical fibers 2. The optical fiber bundle 1 is formed substantially in a cylindrical shape, while the integrated portion 3, being a set of parts of optical fibers 2 fused together to integrate, is formed in a partial conical shape that has a decreasing outside diameter as it extends toward the front end, where it has a front end face 3a polished as a flat plane.

Figure 2:
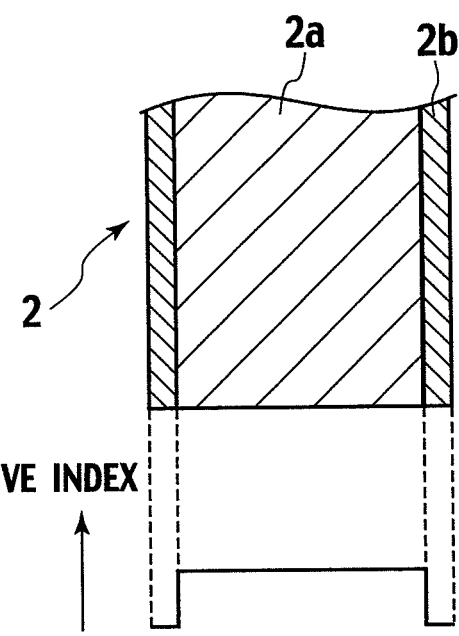
FIG. 2 is a longitudinal sectional view of an optical fiber as an example constituting the optical fiber bundle illustrated in FIG. 1.

The optical fibers 2 are each made up, as illustrated in FIG. 2, by a core 2a made of pure silica glass or the like and configured to transmit incoming light, and a coating 2b configured to clad the core 2a. The coating 2b is made of a substance such as a resin that has a smaller refractive index than the core, and functions as a clad, as well.

Figure 3:
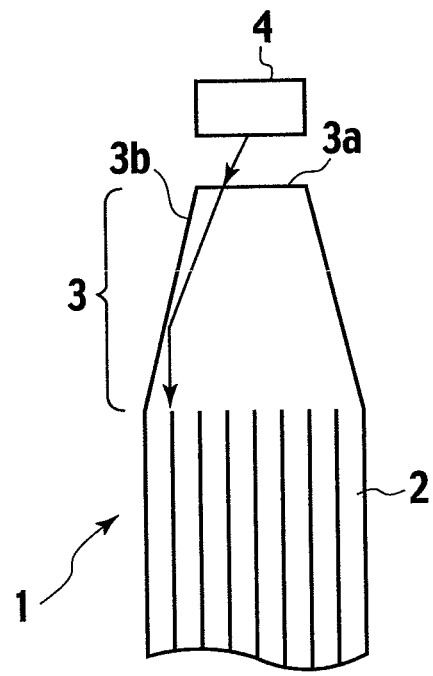
FIG. 3 is an illustration showing an optical path of light having income to the optical fiber bundle illustrated in FIG. 1.

In the optical fiber bundle 1 according to the first embodiment, as illustrated in FIG. 3, at least part of light radiated from a light source 4 composed of an LED or the like has a direction of propagation bent by Snell's law at the front end face 3a of the integrated portion 3, and afterward, it is reflected by a tapered surface 3b of the integrated portion 3, to strike into optical fibers 2, whereby, to any of those optical fibers 2, the angle of incidence is controllable to make smaller than an incidence angle to the front end face 3a. In the example illustrated in FIG. 3, to an optical fiber 2, the angle of incidence is set substantially to a 0 degree, by reflection at the tapered surface 3b.

Such being the case, in the optical fiber bundle 1 according to the first embodiment, incoming light from the light source 4 is reflected at least in part by the tapered surface 3b of the integrated portion 3, whereby the angle of radiation from the light source 4 can be reduced to render close to a numeric aperture of optical fibers 2, thereby allowing for an enhanced efficiency in coupling with the light source 4.

Figure 4:
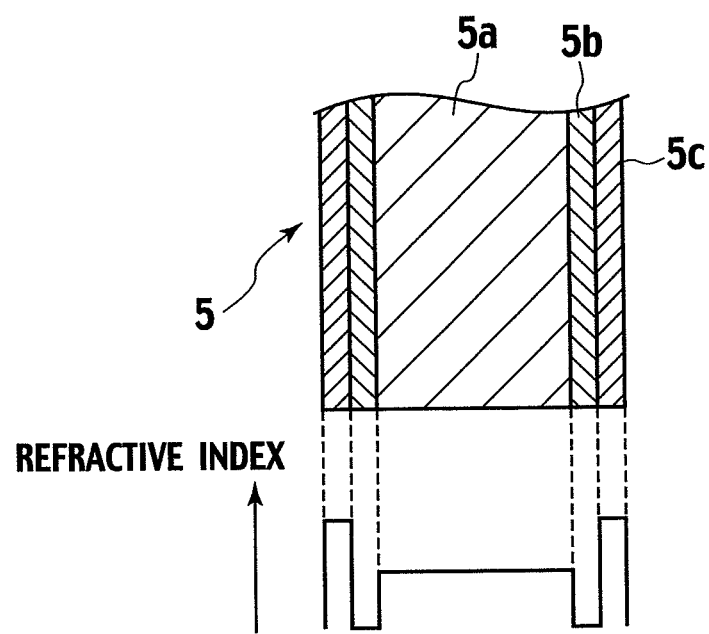
FIG. 4 is a longitudinal sectional view of an optical fiber as another example constituting the optical fiber bundle illustrated in FIG. 1.

It is noted that as an optical fiber used to constitute the optical fiber bundle 1, the optical fiber 2 illustrated in FIG. 2 may well be substituted by such an optical fiber 5 that is made up, as illustrated in FIG. 4, by a core 5a configured to transmit incoming light, a cladding 5b configured to clad the core 5a, and a coating 5c configured to coat the cladding 5b. For confinement of transmitting light in the core 5a that is made of pure silica glass or the like, the cladding 5b is made of a substance that has a smaller refractive index than the core 5a, e.g., being made of fluoridated silica glass.

In such an optical fiber 2 that is composed of a core 2a and a coating 2b with a low refractive index as illustrated in FIG. 2, an entirety of the core 2a being a glass is employable as a transmission path of light. However, in such an optical fiber 5 that is composed of a core 2a, a cladding 5b, and a coating 2b as illustrated in FIG. 4, the cladding 5b though being a glass is unable to work as any transmission path of light, so the cladding 5b constitutes a factor that reduces the efficiency of coupling. Further, the optical fiber 2 illustrated in FIG. 2 is allowed to have a greater difference in refractive index between the core 2a and the coating 2b which works as a clad as well, so it can provide a greater numeric aperture. For the above-noted two points, use of the optical fiber 2 illustrated in FIG. 2 is more advantageous.

On the other hand, in the optical fiber 2 illustrated in FIG. 2, the coating 2b absorbs light, which causes, among others, a power loss of light, and deterioration of coating 2b, constituting an issue in some cases. To this point, the optical fiber 5 illustrated in FIG. 4 has the core 5a surrounded by the cladding 5b of glass, and can be free of such an issue, allowing for a secured stable performance.

Figure 5A:
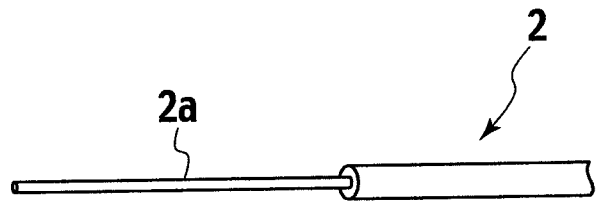
FIG. 5A is an illustration of a process for fabrication of the optical fiber bundle illustrated in FIG. 1.
Figure 5B:
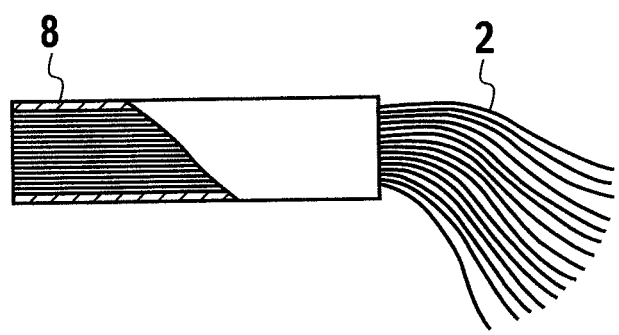
FIG. 5B is an illustration of a process for fabrication of the optical fiber bundle illustrated in FIG. 1.
Figure 5C:
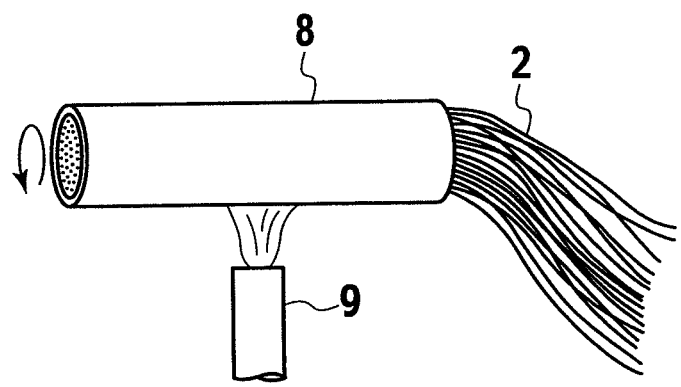
FIG. 5C is an illustration of a process for fabrication of the optical fiber bundle illustrated in FIG. 1.

Description is now made with reference to FIGS. 5A to 5C of a method of fabricating an optical fiber bundle according to the first embodiment, as an example.

First, optical fibers 2 are each prepared, as illustrated in FIG. 5A, by removing a coating 2b of an end portion thereof to thereby strip a terminal of the core 2a.

Next, as illustrated in FIG. 5B, the optical fibers 2 with terminal-stripped cores 2a are bundled together to insert into a glass pipe 8 to be filled up therewith. The glass pipe 8 is made of an identical substance (e.g. pure silica glass) to the cores 2a.

Next, as illustrated in FIG. 5C, the glass pipe 8 as filled up with the cores 2a of optical fibers 2 and set on e.g. a glass lathe (not shown) is rotated about its axis, while being heated at and about a central region thereof by using an oxyhydrogen burner 9. In due course, the glass pipe 8 and cores 2a start softening, when the glass pipe 8 is stretched in both directions, so that the cores 2a themselves as well as the glass pipe 8 are fusion-integrated. Or otherwise, the glass pipe 8 may be set upright and vertically stretched for such an integration among optical fibers 2 and glass pipe 8 (the foregoing being common to the respective embodiments).

Next, a fusion-integrated portion is cut, and a front end of the cut part is ground and polished to provide an integrated portion 3 with a length and a front end face 3a with a diameter, as necessary.

It is noted that for use of the optical fiber 5 illustrated in FIG. 4, part of the coating 5c is removed to strip a terminal of the cladding 5b, and a glass pipe 8 and cores 5a with claddings 5b are fusion-integrated in a manner similar to the above, and afterwards, a fusion-integrated portion is cut, and a front end of the cut part is ground and polished.

(Second Embodiment)

Figure 6:
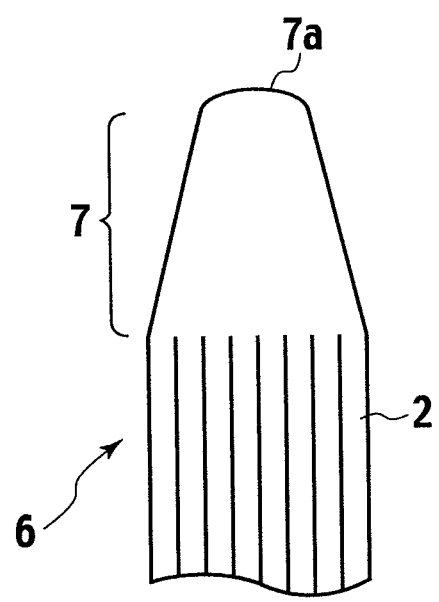
FIG. 6 is a side elevational view of an optical fiber bundle according to a second embodiment of the present invention.

FIG. 6 is a side elevational view of an optical fiber bundle according to a second embodiment of the present invention. In FIG. 6, those parts duplicating the first embodiment are designated by like reference characters, omitting redundant description. Other embodiments will be alike.

As illustrated in FIG. 6, the optical fiber bundle 6 according to the second embodiment is composed of a plurality of optical fibers 2 bundled, regularly or randomly, into a dense bundle, with an integrated portion 7 formed by a fusion integration of distal ends of the bundled plurality of optical fibers 2. The optical fiber bundle 6 is formed substantially in a cylindrical shape, while the integrated portion 7 is formed in a partial conical shape that has a decreasing outside diameter as it extends toward the front end, where it has a front end face 7a as a curved plane.

Figure 7A:
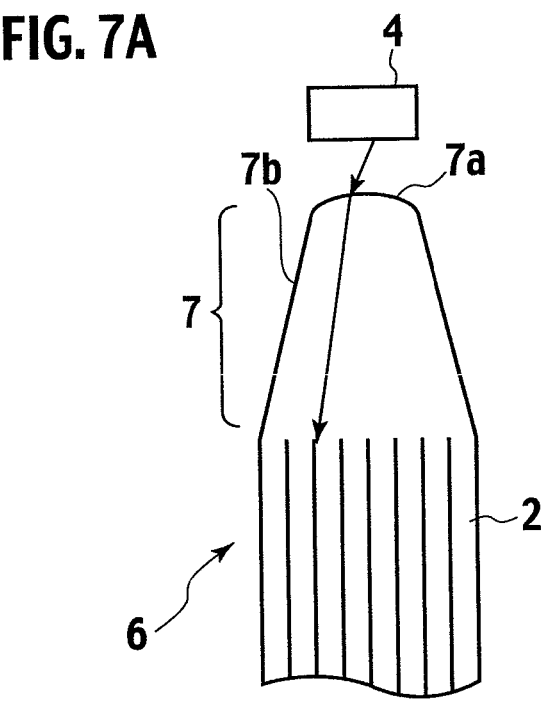
FIG. 7A is an illustration showing an optical path of light having income to the optical fiber bundle illustrated in FIG. 6.
Figure 7B:
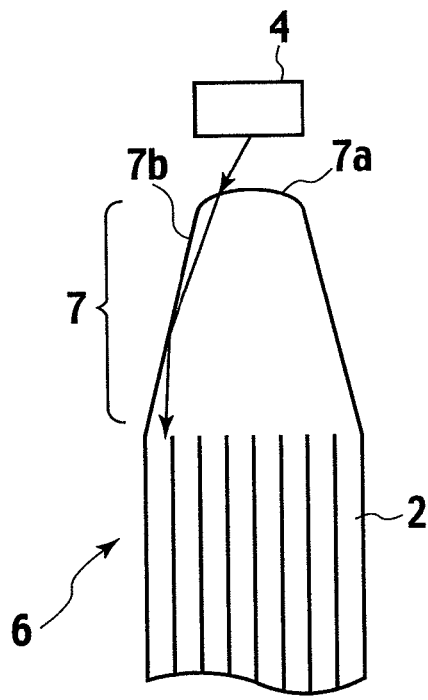
FIG. 7B is an illustration showing an optical path of light having income to the optical fiber bundle illustrated in FIG. 6.

In the optical fiber bundle 6 according to the second embodiment, as illustrated in FIG. 7A, at least part of light radiated from a light source 4 has a direction of propagation bent by a lens effect at the front end face 7a of the integrated portion 7, and afterward, it directly strikes into optical fibers 2. Or alternatively, as illustrated in FIG. 7B, at least part of light radiated from the light source 4 has a direction of propagation bent by a lens effect at the front end face 7a, and afterward, it is reflected by a tapered surface 7b of the integrated portion 7, to strike into optical fibers 2.

By that, like the first embodiment, to any of those optical fibers 2, the angle of incidence is controllable to make smaller than an incidence angle to the front end face 7a, allowing for an enhanced efficiency in coupling with the light source 4.

It is noted that for the second embodiment also, like the first embodiment, the optical fiber 2 illustrated in FIG. 2 may well be substituted by the optical fiber 5 illustrated in FIG. 4.

The optical fiber bundle 1 according to the second embodiment is fabricated by a method, such that a glass pipe 8 and cores 2a are fusion-integrated through processes similar to those of the first embodiment described, and afterwards, a fusion-integrated portion is cut, and the cut face is directly heated to fuse, before making use of tensile forces to form a curved plane.

(Third Embodiment)

Figure 8:
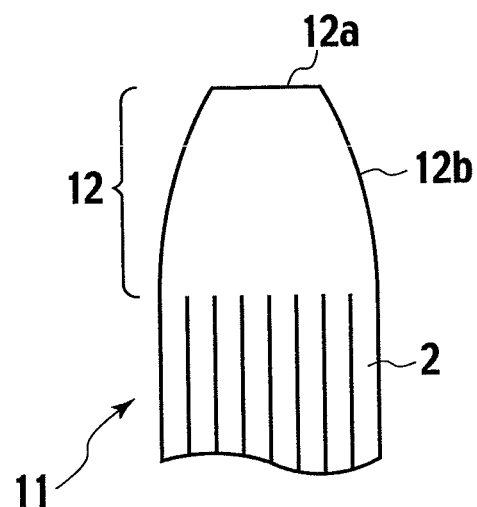
FIG. 8 is a side elevational view of an optical fiber bundle according to a third embodiment of the present invention.
Figure 9:
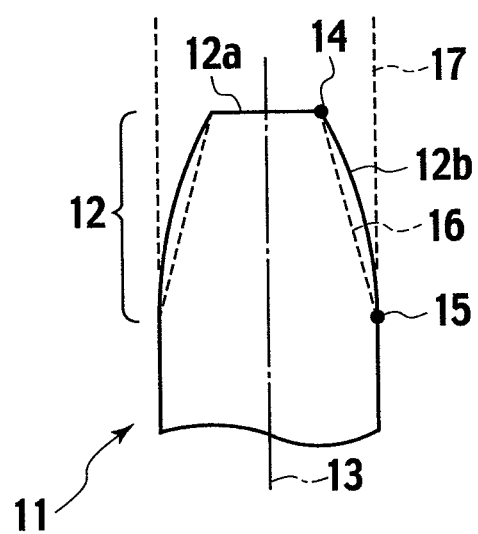
FIG. 9 is a longitudinal sectional view along a center axis of the optical fiber bundle illustrated in FIG. 8.

FIG. 8 is a side elevational view of an optical fiber bundle according to a third embodiment of the present invention. FIG. 9 is a longitudinal sectional view along a center axis of the optical fiber bundle illustrated in FIG. 8.

As illustrated in FIGS. 8 and 9, the optical fiber bundle 11 according to the third embodiment is composed of a plurality of optical fibers 2 bundled, regularly or randomly, into a dense bundle, with an integrated portion 12 formed by a fusion integration of distal ends of the bundled plurality of optical fibers 2, so that it has a decreasing outside diameter as it extends toward the front end.

As illustrated in FIG. 9, the integrated portion 12 has, in a longitudinal sectional plane along a center axis 13 of the optical fiber bundle 11 which is substantially cylindrical in shape, a lateral side 12b thereof formed, in a shape of arc radially outwardly convex with respect to a straight line 16 interconnecting an end point 14 at the side of a front end face 12a thereof and an end point 15 at the side of a rear end thereof, to locate at a radially inner side with respect to an extension 17 toward the integrated portion 12 of a line constituting an outline of a portion else than the integrated portion 12 of the optical fiber bundle 11. The integrated portion 12 has a section perpendicular to the center axis 13 and substantially circular in shape, while the front end face 12a is a polished flat plane.

Figure 10:
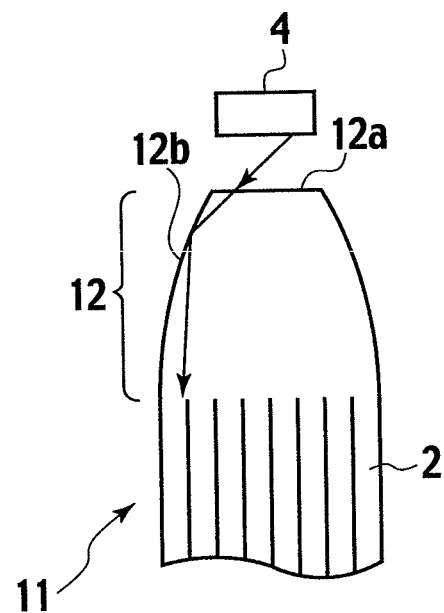
FIG. 10 is an illustration showing an optical path of light having income to the optical fiber bundle illustrated in FIG. 8.

In the optical fiber bundle 11 according to the third embodiment, as illustrated in FIG. 10, at least part of light radiated from a light source 4 has a direction of propagation bent by Snell's law at the front end face 12a of the integrated portion 12, and afterward, it is reflected by the lateral side 12b of the integrated portion 12, to strike into optical fibers 2. By that, to any of those optical fibers 2, the angle of incidence is controllable to make smaller than an incidence angle to the front end face 12a.

In the third embodiment, the integrated portion 12 has the lateral side 12b formed in a shape describing a radially outwardly convex arc in a longitudinal sectional plane, whereby in comparison with the first embodiment it is adapted to have, among rays of incident light to the front end face 12a, an increased proportion of rays of light falling within a range of incidence angles permitting a coupling with any optical fiber 2 by a reduced number of reflection times, thus allowing for a resultant enhancement of efficiency in coupling between the light source 4 and the optical fiber bundle 12.

It is noted that for the third embodiment also, like the first embodiment, the optical fiber 2 illustrated in FIG. 2 may well be substituted by the optical fiber 5 illustrated in FIG. 4.

Further, like the second embodiment, the front end face 12a of the integrated portion 12 may well be shaped as a curved pane.

The optical fiber bundle 11 according to the third embodiment may be fabricated by a method similar to the method of the first embodiment described, subject to adjustments of, among others, a heating position and temperatures to be adequate, when heating by using an oxyhydrogen burner 9, to form such a shape of integrated portion 12 as illustrated in FIG. 8 and FIG. 9.

(Fourth Embodiment)

Figure 11:
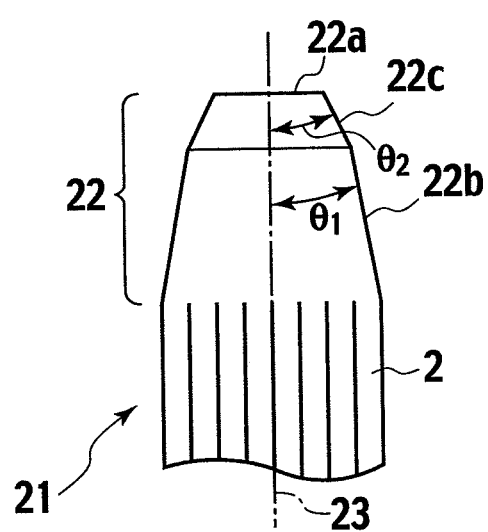
FIG. 11 is a side elevational view of an optical fiber bundle according to a fourth embodiment of the present invention.

FIG. 11 is a side elevational view of an optical fiber bundle according to a fourth embodiment of the present invention.

As illustrated in FIG. 11, the optical fiber bundle 21 according to the fourth embodiment is composed of a plurality of optical fibers 2 bundled, regularly or randomly, into a dense bundle, with an integrated portion 22 formed by a fusion integration of distal ends of the bundled plurality of optical fibers 2. The integrated portion 22 has a front end face 22a as a polished flat plane.

The optical fiber bundle 21 is substantially cylindrical in shape, and the integrated portion 22 has a first tapered surface 22b formed in a partial conical shape with a decreasing outside diameter as it extends toward its front end, and a second tapered surface 22c connected with the front end of the first tapered surface 22b and formed in a partial conical shape with a decreasing outside diameter as it extends toward its front end. The first tapered surface 22b and the second tapered surface 22c are formed so that an angle $\theta_1$ the first tapered surface 22b makes with a center axis 23 of the optical fiber bundle 21 is smaller than an angle $\theta_2$ the second tapered surface 22c makes with the center axis 23.

Figure 12A:
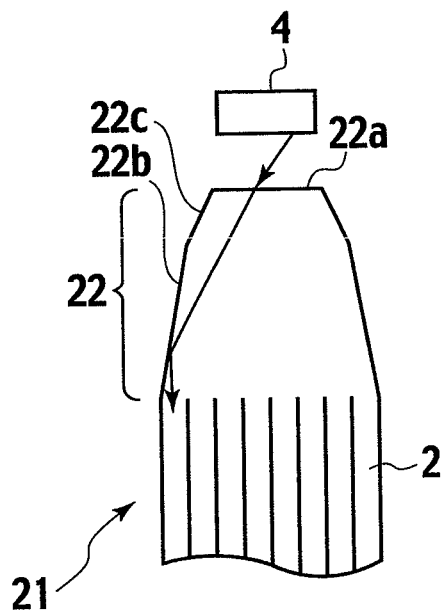
FIG. 12A is an illustration showing an optical path of light having income to the optical fiber bundle illustrated in FIG. 11.
Figure 12B:
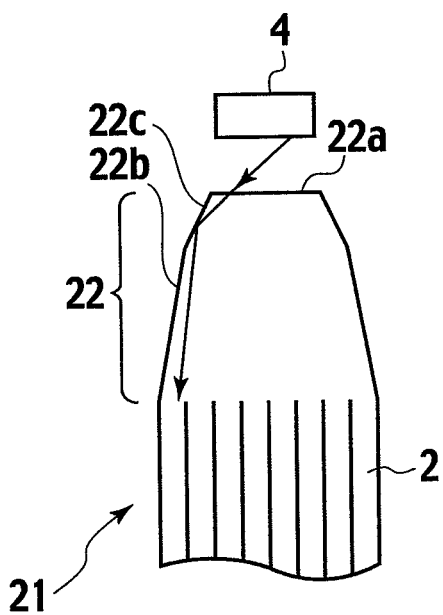
FIG. 12B is an illustration showing an optical path of light having income to the optical fiber bundle illustrated in FIG. 11.

In the optical fiber bundle 21 according to the fourth embodiment, as illustrated in FIG. 12A, at least part of light radiated from a light source 4 has a direction of propagation bent by Snell's law at the front end face 22a, and afterward, it is reflected by the first tapered surface 22b of the integrated portion 22, to strike into optical fibers 2. Further, as illustrated in FIG. 12B, at least part of light radiated from the light source 4 has a direction of propagation bent by Snell's law at the front end face 22a of the integrated portion 22, and afterward, it is reflected by the second tapered surface 22c of the integrated portion 22, to strike into optical fibers 2.

In the fourth embodiment, the integrated portion 22 is formed with the first tapered surface 22b and the second tapered surface 22c in combination, whereby in comparison with the first embodiment it is adapted to have, among rays of incident light to the front end face 22a, an increased proportion of rays of light falling within a range of incidence angles permitting a coupling with any optical fiber 2 by a reduced number of reflection times, thus allowing for a resultant enhancement of efficiency in coupling between the light source 4 and the optical fiber bundle 21.

It is noted that for the fourth embodiment also, like the first embodiment, the optical fiber 2 illustrated in FIG. 2 may well be substituted by the optical fiber 5 illustrated in FIG. 4.

Further, like the second embodiment, the front end face 22a of the integrated portion 22 may well be shaped as a curved pane.

The optical fiber bundle 21 according to the fourth embodiment may be fabricated by a method similar to the method of the first embodiment described, subject to adequate selection of conditions such as on heating temperature, heating position, heating period, heating area, number of oxyhydrogen burners, and orientations of oxyhydrogen burners (i.e., heating directions), to form such a shape of integrated portion 22 as illustrated in FIG. 11.

It is noted that the adequate selection of conditions described above is a common requisition to the present invention, as necessary for an adequate shape of integrated portion to be formed, while the other embodiments simply refer to adequate adjustments of heating temperature and heating position to eliminate redundancy.

Further, for industrial production, it is uneasy to fabricate glass articles with integrated portions of a shape, with a severity, by heating with burners, as well known in the art.

Accordingly, in each embodiment, the shape of integrated portion illustrated is assumed as a most representative form.
(Fifth Embodiment)

Figure 13:
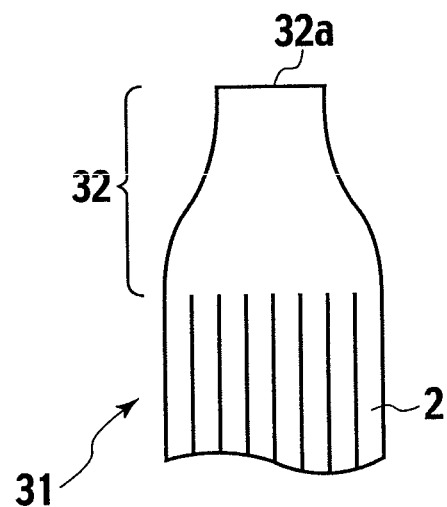
FIG. 13 is a side elevational view of an optical fiber bundle according to a fifth embodiment of the present invention.

FIG. 13 is a side elevational view of an optical fiber bundle according to a fifth embodiment of the present invention, and FIG. 13, a longitudinal sectional view along a center axis of the optical fiber bundle illustrated in FIG. 13.

Figure 14:
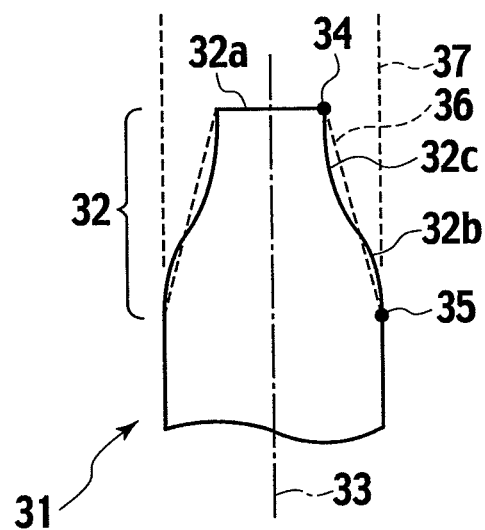
FIG. 14 is a longitudinal sectional view along a center axis of the optical fiber bundle illustrated in FIG. 8.

As illustrated in FIGS. 13 and 14, the optical fiber bundle 31 according to the fifth embodiment is composed of a plurality of optical fibers 2 bundled, regularly or randomly, into a dense bundle, with an integrated portion 32 formed by a fusion integration of distal ends of the bundled plurality of optical fibers 2, so that it has a decreasing outside diameter as it extends toward the front end.

The integrated portion 32 has, in a longitudinal sectional plane along a center axis 33 of the optical fiber bundle 31 which is substantially cylindrical in shape, a lateral side thereof formed, substantially in an S shape consisting of a first arc 32b radially outwardly convex with respect to a straight line 36 interconnecting an end point 34 at the side of a front end face 32a thereof and an end point 35 at the side of a rear end thereof, and a second arc 32c connected with a front end of the first arc 32b and extended to radially inwardly convex with respect to the straight line 36, to locate at a radially inner side with respect to an extension 37 toward the integrated portion 32 of a line constituting an outline of a portion else than the integrated portion 32 of the optical fiber bundle 31. In this case as well, the integrated portion 32 has at the front end thereof an outside diameter smaller than a diameter at a part of the optical fiber bundle 31 where the integration is started, affording a conclusion that it is formed in a partial conical shape with a decreasing outside diameter as it extends toward the front end. The integrated portion 32 has a section perpendicular to the center axis 33 and substantially circular in shape, while the front end face 32a is a polished flat plane.

Figure 15A:
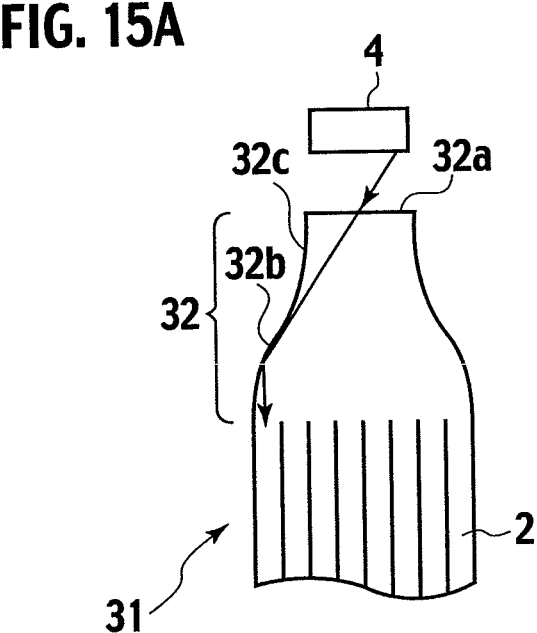
FIG. 15A is an illustration showing an optical path of light having income to the optical fiber bundle illustrated in FIG. 13.
Figure 15B:
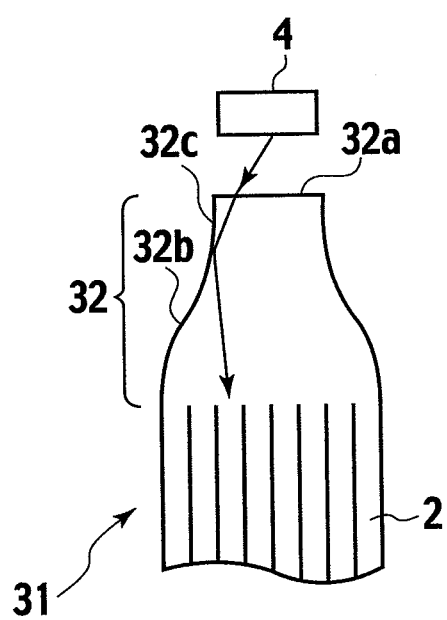
FIG. 15B is an illustration showing an optical path of light having income to the optical fiber bundle illustrated in FIG. 13.

In the optical fiber bundle 31 according to the fifth embodiment, as illustrated in FIG. 15A, at least part of light radiated from a light source 4 has a direction of propagation bent by Snell's law at the front end face 32a of the integrated portion 32, and afterward, it is reflected by a curved side corresponding to the first arc 32b of the integrated portion 32, to strike into optical fibers 2. Further, as illustrated in FIG. 15B, at least part of light radiated from the light source 4 has a direction of propagation bent by Snell's law at the front end face 32a of the integrated portion 32, and afterward, it is reflected by a curved side corresponding to the second arc 32c of the integrated portion 32, to strike into optical fibers 2.

According to the fifth embodiment, in the optical fiber bundle 31, those rays of light incoming from the light source 4 are reflected at least in part by the lateral sides of the integrated portion 32, which affords for the light source 4 to have an angle of radiation reduced to close to a numeric aperture of optical fibers 2, thereby allowing for an enhanced efficiency in coupling with the light source 4.

It is noted that for the fifth embodiment also, like the first embodiment, the optical fiber 2 illustrated in FIG. 2 may well be substituted by the optical fiber 5 illustrated in FIG. 4.

Further, like the second embodiment, the front end face 32a of the integrated portion 32 may well be shaped as a curved pane.

The optical fiber bundle 31 according to the fifth embodiment may be fabricated by a method similar to the method of the first embodiment described, subject to adjustments of, among others, a heating position and temperatures to be adequate, when heating by using an oxyhydrogen burner 9, to form such a shape of integrated portion 32 as illustrated in FIG. 13 and FIG. 14.

Description is now made of specific examples of the embodiments of the present invention.

EMBODIMENT EXAMPLES 1 to 8

Figure 16:
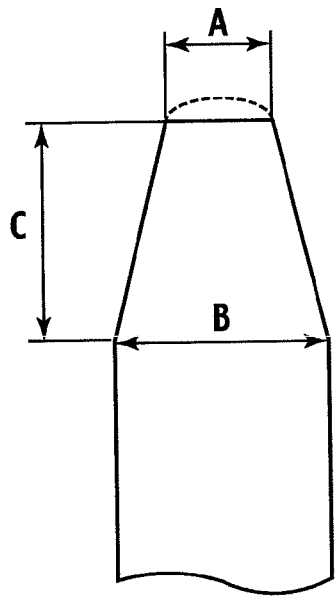
FIG. 16 is an illustration for explanation of dimensions of an integrated portion.

To provide an optical fiber bundle 1, 320 optical fibers 2 were bundled together, having distal ends thereof fusion-integrated, thereby forming an integrated portion 3 of a partial conical shape with a decreasing outside diameter as it extends toward a front end, and a front end face 3a of the integrated portion 3 was polished to be a flat plane. The optical fibers 2 used had a numeric aperture of 0.2. For an embodiment example 1, there were settings including A=2.5 mm as a diameter of front end face 3a of integrated portion 3, B=4.3 mm as a maximum diameter of integrated portion 3, and C=1.0 mm as a length (taper length) of integrated portion 3 (refer to FIG. 16). For embodiment examples 2 to 8, no more than the length C of integrated portion 3 was changed.

Light source 4 used was a 365-mm wavelength ultraviolet LED with an emitter size 1 mm×1 mm, having a center of light source 4 coincident with a center of integrated portion 3 (as being common to the following embodiment examples), and a setting D=15 mm as a distance between light source 4 and front end face 3a of integrated portion 3, for measurements of coupling efficiency between light source 4 and optical fiber bundle 1.

EMBODIMENT EXAMPLE 9

To provide an optical fiber bundle 6, 320 optical fibers 2 were bundled together, having distal ends thereof fusion-integrated, thereby forming an integrated portion 7 of a partial conical shape with a decreasing outside diameter as it extends toward a front end, and a front end face 7a of the integrated portion 7 was polished to be a curved plane. For embodiment example 9, there were settings including A=2.0 mm as a diameter of front end face 7a of integrated portion 7, B=4.3 mm as a maximum diameter of integrated portion 7, and C=5.0 mm as a length of a tapered part of integrated portion 7 (refer to FIG. 16).

Light source 4 used was identical to that of embodiment example 1, and had a setting D=1.5 mm as a distance between light source 4 and front end face 7a of integrated portion 7, for measurements of coupling efficiency between light source 4 and optical fiber bundle 6.

COMPARATIVE EXAMPLE

To provide an optical fiber bundle, 320 optical fibers were bundled together, having distal ends thereof fusion-integrated, and a front end face of the integrated portion was polished to be a flat plane. For the comparative example, the integrated portion was not tapered, but had a cylindrical shape, such that A=4.3 mm as a diameter of front end face, and B=4.3 mm as a diameter of integrated portion.

Light source 4 used was identical to that of embodiment example 1, and had a setting D=1.5 mm as a distance between light source 4 and the front end face of integrated portion, for measurements of coupling efficiency between light source 4 and the optical fiber bundle.

Figure 17:
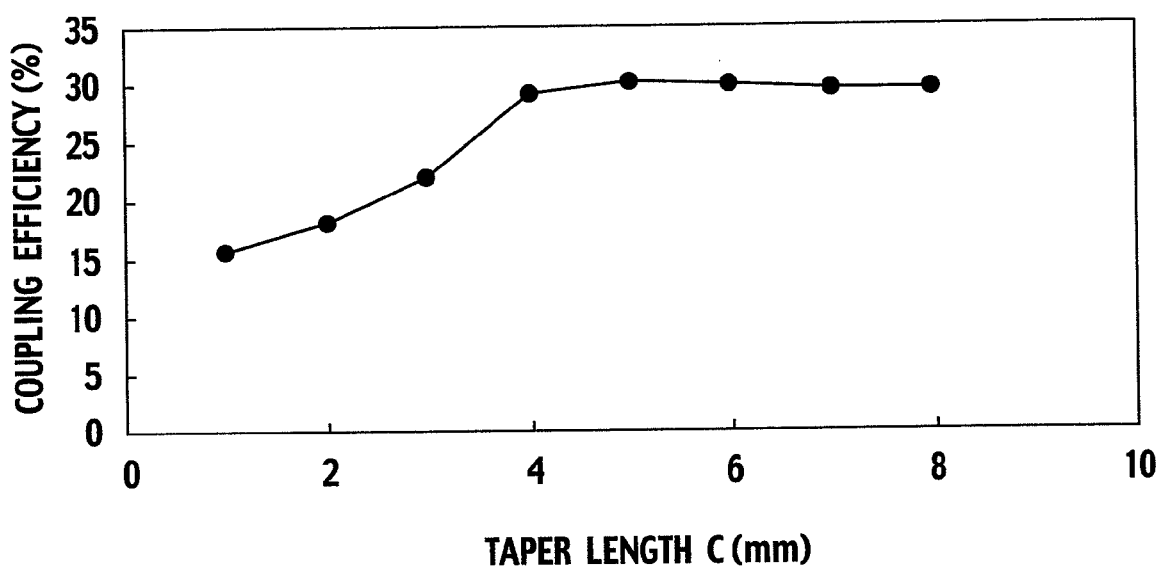
FIG. 17 is a graph showing a relationship between coupling efficiencies and taper lengths in embodiment examples 1 to 8.

For embodiment examples 1 to 9 and comparative example, Table 1 lists up dimensions of integrated portion and measurement results of coupling efficiency. Further, FIG. 17 shows a relationship between coupling efficiencies and taper lengths C in embodiment examples 1 to 8.

TABLE 1

| | End face configuration | A (mm) | B (mm) | C (mm) | D (mm) | Coupling efficiency (%) |
|---|---|---|---|---|---|---|
| Emb ex 1 | Flat plane | 2.5 | 4.3 | 1.0 | 1.5 | 15.5 |
| Emb ex 2 | Flat plane | 2.5 | 4.3 | 2.0 | 1.5 | 18.0 |
| Emb ex 3 | Flat plane | 2.5 | 4.3 | 3.0 | 1.5 | 22.0 |

TABLE 1-continued

| | End face configuration | A (mm) | B (mm) | C (mm) | D (mm) | Coupling efficiency (%) |
|---|---|---|---|---|---|---|
| Emb ex 4 | Flat plane | 2.5 | 4.3 | 4.0 | 1.5 | 29.0 |
| Emb ex 5 | Flat plane | 2.5 | 4.3 | 5.0 | 1.5 | 30.0 |
| Emb ex 6 | Flat plane | 2.5 | 4.3 | 6.0 | 1.5 | 29.8 |
| Emb ex 7 | Flat plane | 2.5 | 4.3 | 7.0 | 1.5 | 29.5 |
| Emb ex 8 | Flat plane | 2.5 | 4.3 | 8.0 | 1.5 | 29.4 |
| Emb ex 9 | Curv. plane | 2.0 | 4.3 | 5.0 | 1.5 | 24.0 |
| Comp ex | Flat plane | 4.3 | 4.3 | — | 1.5 | 14.0 |

As supported by measurements results in Table 1, optical fiber bundles according to embodiment examples 1 to 9 had high coupling efficiencies relative to the optical fiber bundle of comparative example.

For flat front end faces, the longer the length C of integrated portion 3 became, the higher was the coupling efficiency obtained within a range of lengths C of integrated portion 3 up to 4.0 mm (embodiment examples 1 to 4). This reason will be discussed with reference to FIG. 18.

Figure 18:
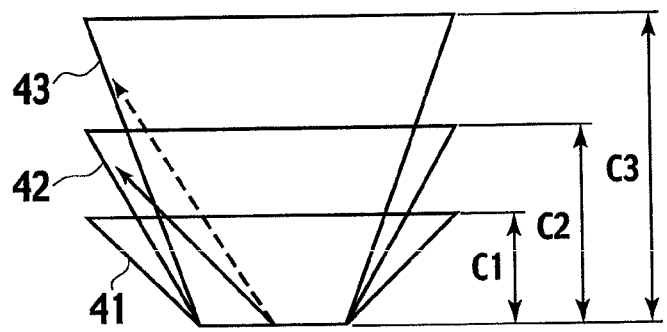
FIG. 18 is a schematic diagram for explanation of correspondence between coupling efficiencies and taper lengths.

In FIG. 18, there is such light as indicated by an arrow of solid line, and such light as indicated by an arrow of broken line, of which neither is reflected by a tapered surface 41 with a taper length $C_1$, where it is disabled to reduce an ongoing angle of light by reflection. To this point, there is a tapered surface 42 with a taper length $C_2$ ($>C_1$), which does not reflect such light as indicated by the arrow of broken line, but reflects such light as indicated by the arrow of solid line, permitting the coupling efficiency to be improved by reflection relative to the tapered surface 41. Further, there is a tapered surface 43 with a taper length $C_3$ ($>C_2$), which reflects both such light as indicated by the arrow of broken line and such light as indicated by the arrow of solid line, thus having an increased proportion of reflected light relative to the tapered surface 41 or 42, allowing for a still improved coupling efficiency.

Such being the case, for rays of light arriving at any optical fiber after reflection by a tapered surface, the proportion is increased, as the taper length is increased. That is, for rays of light reflected to strike in any optical fiber with a reduced angle of incidence, the proportion is increased, allowing for an enhanced coupling efficiency.

On the other hand, in FIG. 18, for such light as indicated by the arrow of broken line, if the angle of incidence to any optical fiber 2 is smaller than an acceptance angle (numeric aperture) of optical fibers, such light as indicated by the arrow of broken line is coupled with any optical fiber irrespective of presence or absence of reflection by any tapered surface. That is, between tapered surface 42 and tapered surface 43, there appears little difference to be observed in actions to such light as indicated by the arrow of broken line, though in a strict sense there being a little difference due to a difference between angles of the tapered surfaces. Such being the case, for taper lengths longer than a certain extent, the ongoing angle of light becomes sufficiently small for a coupling with core, losing effects of reflection, with little variations caused in coupling efficiency.

Accordingly, for flat front end faces, there were little variations observed in coupling efficiency of integrated portions 3 of lengths C within a range of 5.0 to 8.0 mm (embodiment examples 5 to 8), while these each exhibited as high coupling efficiency as the embodiment example 4.

EMBODIMENT EXAMPLES 10 to 27

Relative to embodiment example 1, the length C of integrated portion 3 and the distance D between light source 4 and front end face 3a of integrated portion 3 were changed to fabricate optical fiber bundles 1 for embodiment examples 10 to 27, whereto measurements were made of efficiencies in coupling with a light source 4 identical to that of the embodiment example 1.

For embodiment examples 10 to 27, Table 2 lists up dimensions of integrated portion 3 and measurement results of coupling efficiency. Further, FIG. 19 shows relationships between coupling efficiencies and distances D in embodiment examples 10 to 27.

TABLE 2

|  | End face configuration | A (mm) | B (mm) | C (mm) | D (mm) | Coupling efficiency (%) |
|---|---|---|---|---|---|---|
| Emb ex 10 | Flat plane | 2.5 | 4.3 | 4.0 | 0.5 | 28.6 |
| Emb ex 11 | Flat plane | 2.5 | 4.3 | 6.0 | 0.5 | 28.6 |
| Emb ex 12 | Flat plane | 2.5 | 4.3 | 8.0 | 0.5 | 28.3 |
| Emb ex 13 | Flat plane | 2.5 | 4.3 | 4.0 | 1.0 | 30.0 |
| Emb ex 14 | Flat plane | 2.5 | 4.3 | 6.0 | 1.0 | 29.9 |
| Emb ex 15 | Flat plane | 2.5 | 4.3 | 8.0 | 1.0 | 29.6 |
| Emb ex 16 | Flat plane | 2.5 | 4.3 | 4.0 | 1.5 | 29.0 |
| Emb ex 17 | Flat plane | 2.5 | 4.3 | 6.0 | 1.5 | 29.8 |
| Emb ex 18 | Flat plane | 2.5 | 4.3 | 8.0 | 1.5 | 29.4 |
| Emb ex 19 | Flat plane | 2.5 | 4.3 | 4.0 | 2.0 | 26.6 |
| Emb ex 20 | Flat plane | 2.5 | 4.3 | 6.0 | 2.0 | 28.4 |
| Emb ex 21 | Flat plane | 2.5 | 4.3 | 8.0 | 2.0 | 27.5 |
| Emb ex 22 | Flat plane | 2.5 | 4.3 | 4.0 | 2.5 | 23.2 |
| Emb ex 23 | Flat plane | 2.5 | 4.3 | 6.0 | 2.5 | 25.8 |
| Emb ex 24 | Flat plane | 2.5 | 4.3 | 8.0 | 2.5 | 25.0 |
| Emb ex 25 | Flat plane | 2.5 | 4.3 | 4.0 | 3.0 | 20.6 |
| Emb ex 26 | Flat plane | 2.5 | 4.3 | 6.0 | 3.0 | 22.7 |
| Emb ex 27 | Flat plane | 2.5 | 4.3 | 8.0 | 3.0 | 22.7 |

Figure 19:
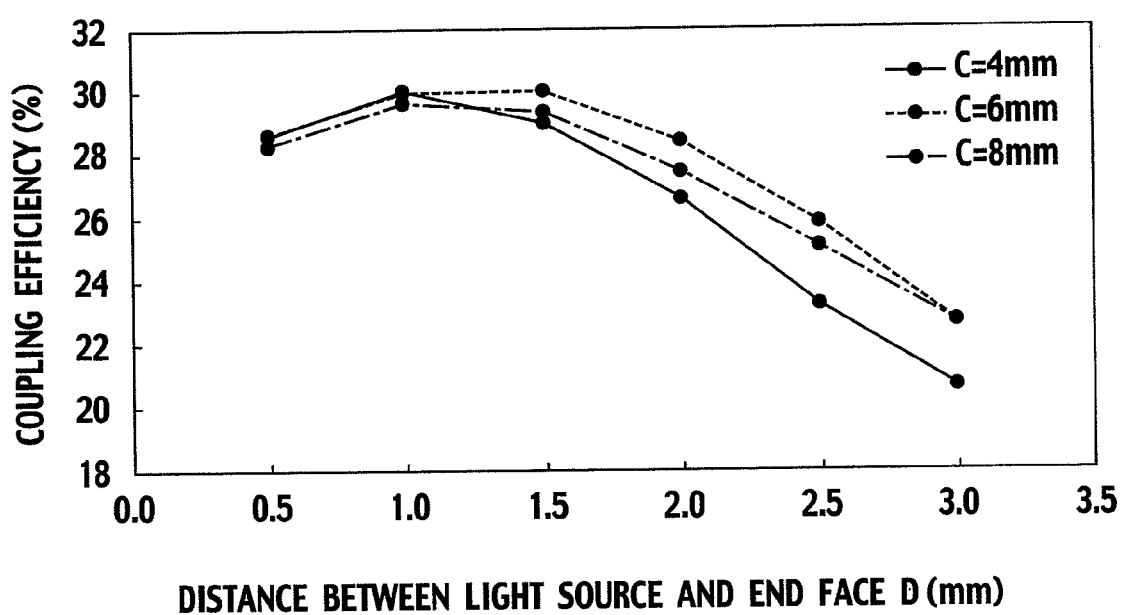
FIG. 19 is a graph showing relationships between coupling efficiencies and distances between a light source and front end faces of integrated portions in embodiment examples 10 to 27.

As supported by measurement results in Table 2 and FIG. 19, for any of taper lengths C being 4.0 mm, 6.0 mm, and 8.0 mm, the greater the distance D was the lower the coupling efficiency became, for distances D within a range of 2.0 mm or more (embodiment examples 19 to 27). This is because the greater the distance D is the more amount of light is to be leaked outside, without striking into front end face 3a of integrated portion 3. To obtain a desirable coupling efficiency, the distance D should be made short to some extent. For each of distances D within a range of 1.5 mm or less (embodiment examples 10 to 18), the coupling efficiency obtained was favorable.

EMBODIMENT EXAMPLES 28 to 36

Figure 20:
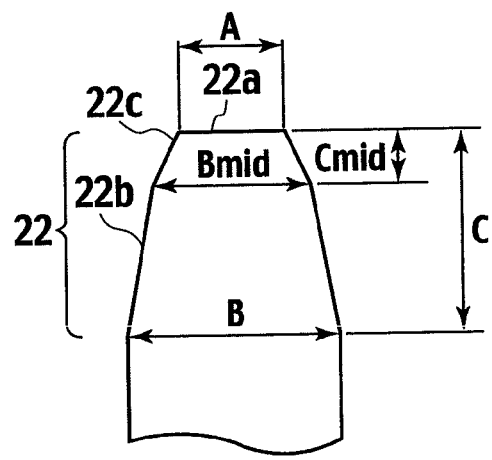
FIG. 20 is an illustration for explanation of dimensions of integrated portions in embodiment examples 28 to 36.

To provide an optical fiber bundle 21, 320 optical fibers 2 were bundled together, fusion-integrating distal ends thereof, thereby having an integrated portion 22 formed with a first tapered surface 22b and a second tapered surface 22c, and a front end face 22a of the integrated portion 22 was polished to be a flat plane. The optical fibers 2 used had a numeric aperture of 0.22. For an embodiment example 28, there were settings including A=2.5 mm as a diameter of front end face 22a of integrated portion 22, B=4.3 mm as a maximum diameter of integrated portion 22, $B_{mid}$=3.4 mm as a maximum diameter of second tapered face 22c, C=3.0 mm as a length (taper length) of integrated portion 22, and $C_{mid}$=1.4 mm as a length of part where second tapered surface 22c was formed (refer to FIG. 20). For embodiment examples 29 to 36, changed was the length C of integrated portion 3, and the length $C_{mid}$ of the part where second tapered surface 22c was formed.

Light source 4 used was identical to that of embodiment example 1, and had a setting D=1.5 mm as a distance between light source 4 and front end face 22a of integrated portion 22, for measurements of coupling efficiency between light source 4 and optical fiber bundle 21.

EMBODIMENT EXAMPLES 37 to 45

Relative to embodiment example 1, the numeric aperture of optical fibers 2 constituting optical fiber bundle 1 was changed to 0.22, and the length C of integrated portion 3 was changed to fabricate optical fiber bundles 1 for embodiment examples 37 to 45, whereto measurements were made of efficiencies in coupling with a light source 4 identical to that of the embodiment example 1.

Figure 21:
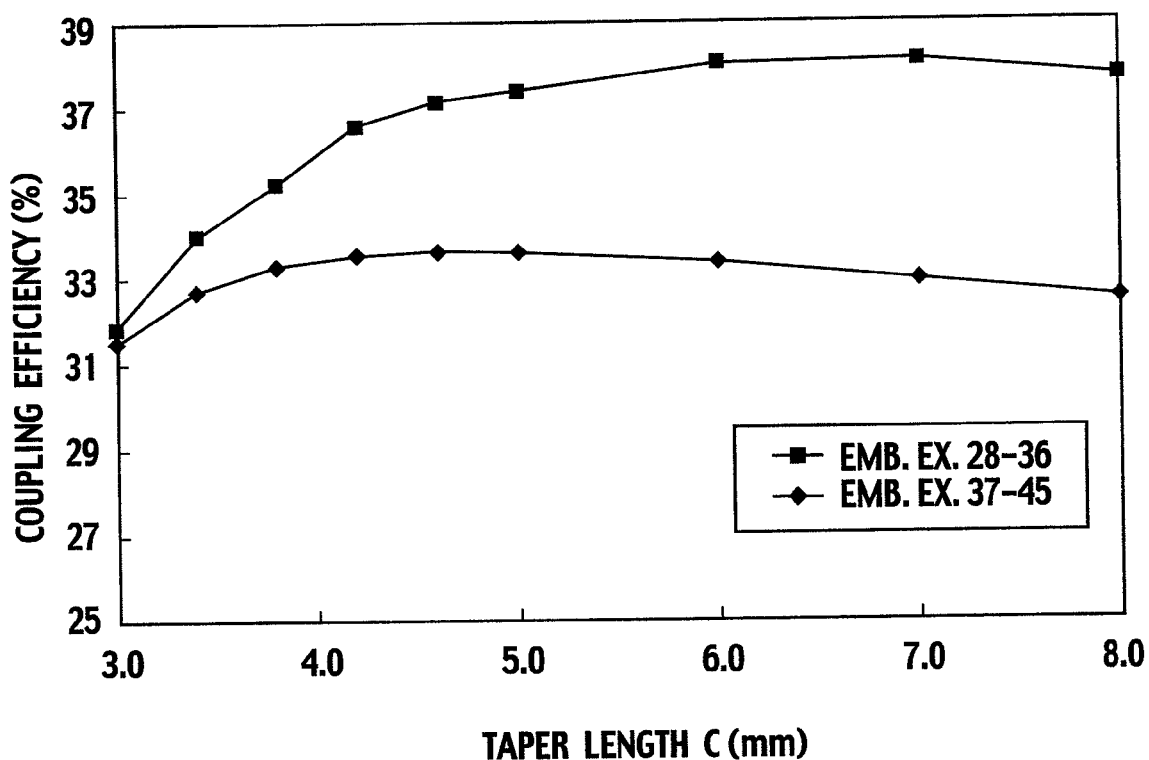
FIG. 21 is a graph showing relationships between coupling efficiencies and taper lengths in embodiment examples 28 to 45.

For embodiment examples 28 to 45, Table 3 lists up dimensions of integrated portion and measurement results of coupling efficiency. Further, FIG. 21 shows relationships between coupling efficiencies and taper lengths C in embodiment examples 28 to 45.

TABLE 3

|  | End face configuration | A (mm) | B (mm) | Bmid (mm) | C (mm) | Cmid (mm) | D (mm) | Coupling efficiency (%) |
|---|---|---|---|---|---|---|---|---|
| Emb ex 28 | Flat plane | 2.5 | 4.3 | 3.4 | 3.0 | 1.4 | 1.5 | 31.8 |
| Emb ex 29 | Flat plane | 2.5 | 4.3 | 3.4 | 3.4 | 1.4 | 1.5 | 34.0 |
| Emb ex 30 | Flat plane | 2.5 | 4.3 | 3.4 | 3.8 | 1.6 | 1.5 | 35.2 |
| Emb ex 31 | Flat plane | 2.5 | 4.3 | 3.4 | 4.2 | 1.6 | 1.5 | 36.5 |
| Emb ex 32 | Flat plane | 2.5 | 4.3 | 3.4 | 4.6 | 1.6 | 1.5 | 37.1 |
| Emb ex 33 | Flat plane | 2.5 | 4.3 | 3.4 | 5.0 | 1.6 | 1.5 | 37.4 |
| Emb ex 34 | Flat plane | 2.5 | 4.3 | 3.4 | 6.0 | 2.0 | 1.5 | 38.0 |
| Emb ex 35 | Flat plane | 2.5 | 4.3 | 3.4 | 7.0 | 2.0 | 1.5 | 38.1 |
| Emb ex 36 | Flat plane | 2.5 | 4.3 | 3.4 | 8.0 | 2.0 | 1.5 | 37.7 |
| Emb ex 37 | Flat plane | 2.5 | 4.3 | — | 3.0 | — | 1.5 | 31.5 |
| Emb ex 38 | Flat plane | 2.5 | 4.3 | — | 3.4 | — | 1.5 | 32.7 |
| Emb ex 39 | Flat plane | 2.5 | 4.3 | — | 3.8 | — | 1.5 | 33.3 |
| Emb ex 40 | Flat plane | 2.5 | 4.3 | — | 4.2 | — | 1.5 | 33.5 |
| Emb ex 41 | Flat plane | 2.5 | 4.3 | — | 4.6 | — | 1.5 | 33.6 |
| Emb ex 42 | Flat plane | 2.5 | 4.3 | — | 5.0 | — | 1.5 | 33.6 |
| Emb ex 43 | Flat plane | 2.5 | 4.3 | — | 6.0 | — | 1.5 | 33.3 |
| Emb ex 44 | Flat plane | 2.5 | 4.3 | — | 7.0 | — | 1.5 | 32.9 |
| Emb ex 45 | Flat plane | 2.5 | 4.3 | — | 8.0 | — | 1.5 | 32.5 |

As supported by measurement results in Table 3, there was a favorable coupling efficiency given by each of optical fiber bundles for embodiment examples 28 to 45. In particular, in embodiment examples 28 to 36, it was enabled relative to embodiment examples 37 to 45, to have, among rays of incident light, an increased proportion of rays of light changed within a range of incidence angles permitting a coupling with any optical fiber 2 by a reduced number of reflection times, thus allowing for a favorable coupling efficiency to be obtained.

Figure 22:
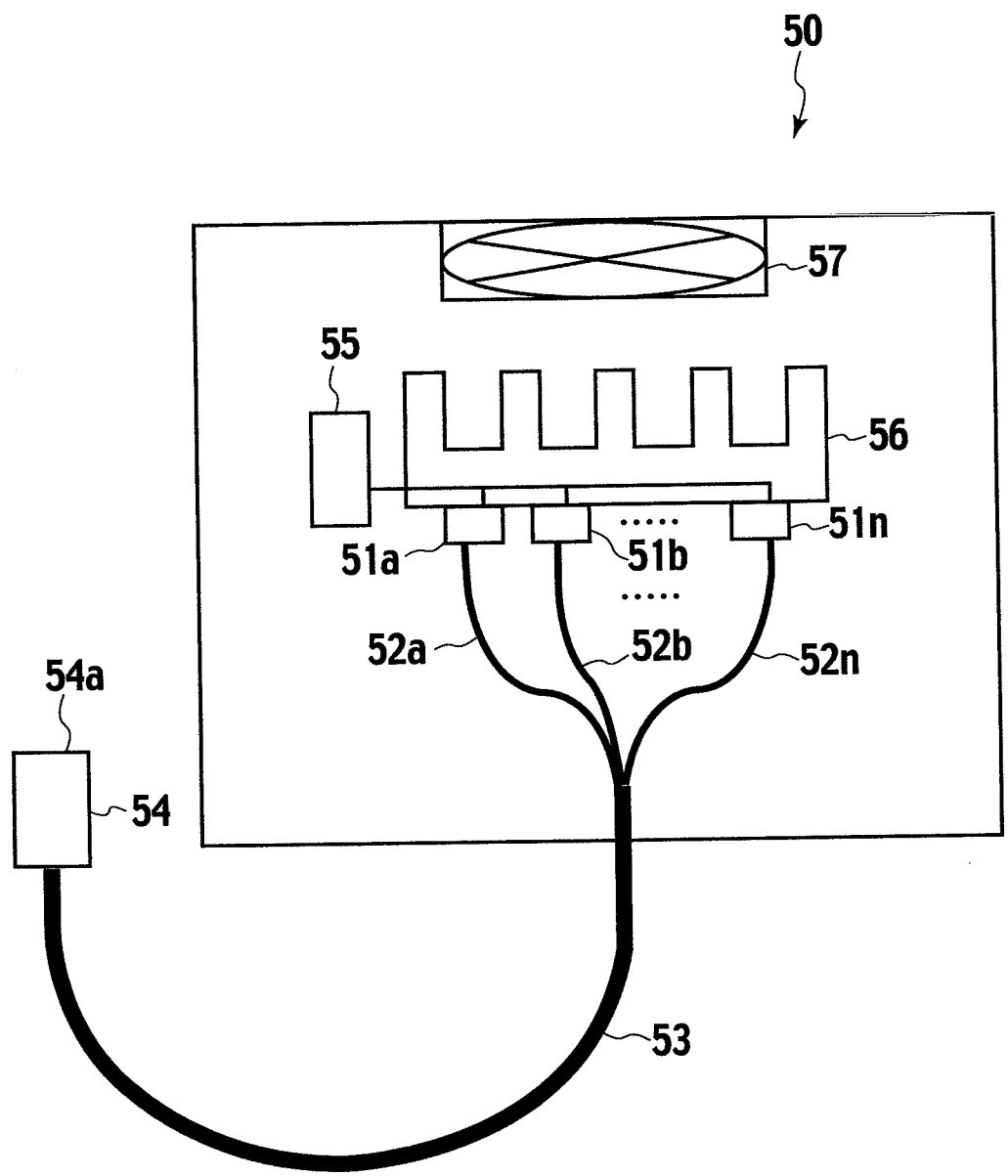
FIG. 22 is a diagram of configuration of an optical irradiator according to the present invention.

FIG. 22 is a diagram of configuration of an optical irradiator using optical fiber bundles according to the present invention.

The optical irradiator 50 illustrated in FIG. 22 includes one or more light sources 51a, 51b, ..., 51n, a set of optical fiber bundles 52a, 52b, ..., 52n corresponding to the light sources 51a, 51b, ..., 51n, an optical fiber bundle 53 composed of the set of optical fiber bundles 52a, 52b, ..., 52n bundled together, an optical irradiation head 54, a control substrate 55, a heat sink 56, and a cooling fan 57.

The light sources 51a, 51b, ..., 51n installed are each composed of an ultraviolet LED configured for emission of ultraviolet rays, for instance, and thermally joined to the heat sink 56.

The optical fiber bundles 52a, 52b, ..., 52n are each composed of several hundreds of optical fibers of diameters of several micrometers or near bundled together in a dense bundle. Each optical fiber bundle 52a, 52b, ..., 52n has a diameter of several millimeters or near. The optical fiber bundles 52a, 52b, ..., 52n have their one ends optically coupled with the light sources 51a, 51b, ..., 51n, respectively, and adapted for incidence of light to their ends.

The optical fiber bundles 52a, 52b, ..., 52n used may well be any one of optical fiber bundles 1, 6, 11, 21, and 31 in the first to fifth embodiments described.

The optical fiber bundle 53 is made up as a dense bundle of optical fiber bundles 52a, 52b, ..., 52n, for propagation of rays of light having income from the light sources 51a, 51b, ..., 51n to the optical fiber bundles 52a, 52b, ..., 52n. The optical fiber bundle 53 is surrounded by a metallic flexible tube to cover for protection.

The optical fiber bundle 53 has a tip at the exit end thereof, which is inserted into the optical irradiation head 54. The optical irradiation head 54 is configured with unshown built-in lens, for collection of rays of light from the light sources 51a, 51b, ..., 51n, as outgoing from the tip of optical fiber bundle 53, to output them.

The optical fiber bundle 53, inserted to the optical irradiation head 54, is configured as a dense bundle of multiple optical fibers, so the tip at the exit end is allowed to have an outline in a variety of shapes.

Figure 23A:
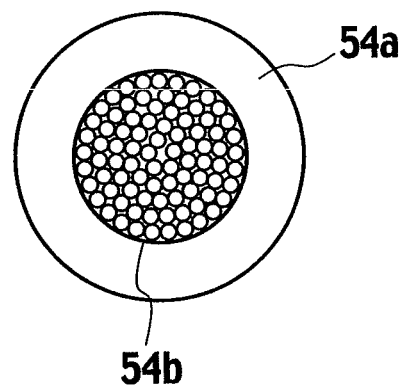
FIG. 23A is an illustration of an end face of an optical irradiation head, as an example.
Figure 23B:
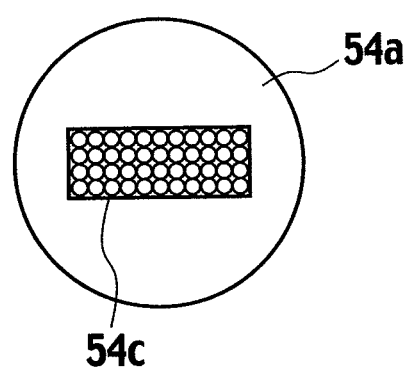
FIG. 23B is an illustration of an end face of an optical irradiation head, as another example.

FIG. 23A is an illustration of an end face 54a of the optical irradiation head 54 configured so that the tip at the exit end of the optical fiber bundle 53 has a circular outline. In this case, rays of light propagated by the optical fiber bundle 53 are output from a circular exit aperture 54b to the outside. FIG. 23B is an illustration of an end face 54a of the optical irradiation head 54 configured so that the tip at the exit end of the optical fiber bundle 53 has a rectangular outline. In this case, rays of light propagated by the optical fiber bundle 53 are output from a rectangular exit aperture 54c to the outside.

The control substrate 55 is configured as an electric substrate to implement controls such as of drive currents and on-off actions of the light sources 51a, 51b, ..., 51n, etc.

The heat sink 56 is configured to take in heat dissipated at the light sources 51a, 51b, ..., 51n, to radiate. The cooling fan 57 is adapted to send blasts of air to the control substrate 55 and the heat sink 56, for cooling them. The cooling may be effected simply by radiation of hat, without provision of cooling fan 57.

In the optical irradiator 50 configured as described, drive currents are supplied from the control substrate 55 to the light sources 51a, 51b, ..., 51n, in accordance with operations by an operator to an unshown operational equipment. With drive currents supplied from the control substrate 55, the light sources 51a, 51b, ..., 51n are driven to radiate rays of light. Rays of light radiated from the light sources 51a, 51b, ..., 51n strike into ends of the optical fiber bundles 52a, 52b, ..., 52n.

The optical fiber bundles 52a, 52b, ..., 52n and the optical fiber bundle 53 propagate rays of incoming light from the ends of optical fiber bundles 52a, 52b, ..., 52n. And, at the optical irradiation head 54, plural built-in lens function to collect such rays of light from the light sources 51a, 51b, ..., 51n as outgoing from the tip of optical fiber bundle 53, to output them. The operator may hold the optical irradiation head 54 in the hand for a work to irradiate a target or irridation, such as a photo-curable resin, with light.

The light sources 51a, 51b, ..., 51n dissipate heat when driven, which heat is absorbed in a sense to the heat sink 56, where it is radiated. And, the heat sink 56 as well as the control substrate 55 is cooled with a blast of air sent from the cooling fan 57.

Like this, in the optical irradiator 50, rays of light radiated from the light sources 51a, 51b, ..., 51n are propagated by the optical fiber bundles 52a, 52b, ..., 52n, whereby a set of light sources 51a, 51b, ..., 51n and a set of optical fiber bundles 52a, 52b, ..., 52n are separated from each other, allowing for an efficient cooling of light sources 51a, 51b, ..., 51n by a combination of heat sink 56 and cooling fan 57. This effectively suppresses a variation of optical output due to accumulation of heat at light sources 51a, 51b, ..., 51n.

Further, as the optical fiber bundle 53 is configured for the tip at the exit end to have an outline in a variety of shapes, the outline of the tip at the exit end of the optical fiber bundle 53 can be formed in accordance with a shape f a target region to be irradiates with light. For in stance, as illustrated in FIG. 23B, the tip at the exit end of the optical fiber bundle 53 can be outlined in a rectangular shape, thereby permitting a photo-curable resin coated in the rectangular region to be cured by irradiating with light at once.

Figure 24:
FIG. 24 is a diagram as a model illustrating a light power distribution of optical output of an optical irradiator directly using output light of LED's.

In direct use of emitted light of LED as in an ultraviolet irradiator in the patent document 2, the optical output has such a distribution light power as illustrated in FIG. 24, where an irradiation pattern of a light emitting element of LED is left to some extent, failing to implement an even distribution of light power.

Figure 25:
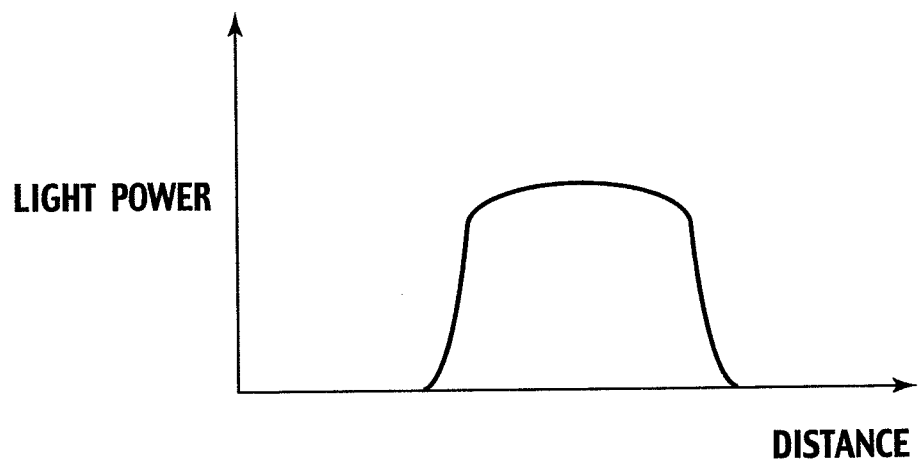
FIG. 25 is a diagram as a model illustrating a light power distribution of optical output of the optical irradiator in FIG. 2.

To the contrary, the optical irradiator 50 employs the optical fiber bundle 53 configured as a dense bundle of multiple optical fiber bundles, thereby allowing for an even distribution of light power even if individual optical fibers give different light power. FIG. 25 is a diagram as a model illustrating a light power distribution of optical output of the optical irradiator 50. In FIG. 25, the distribution of light power is given a top hat shape, which is free of such an irradiation pattern of LED as illustrated in FIG. 24.

The invention claimed is:

1. Optical fiber bundles for an optical irradiator, the optical irradiator comprising light emitting devices configured for emission of light, the optical fiber bundles respectively configured with an incidence end, for propagating light incoming from the light emitting devices to the incidence end corresponding thereto, the output optical fiber bundle having and end portion at an exit end providing an output section of the optical irradiator configured to collect light from the light emitting devices as propagated by the fiber bundles externally output said collected light; the optical fiber bundles respectively comprising;
- a bundle of optical fibers, the optical fibers having distal ends thereof integrated together as an integrated portion, the optical fibers each comprising a core made of glass, and a coating configured to clad the core, the coating is made of resin having a smaller refractive index than the core, the integrated portion formed by a fusion integration of distal ends of terminal-stripped cores exposed by removing the coatings of the optical fibers; and
- a glass pipe filled up with the terminal-stripped cores of the optical fibers,
- wherein the terminal-stripped cores of the optical fibers and the glass pipe are completely integrated in the integrated portion,
- wherein the integrated portion being formed in a partial conical shape having a decreasing outside diameter as the integrated portion extends toward a front end thereof so as to make smaller the angle of incidence than the incidence angle to the front end face of the integrated portion by the internal reflection of a side surface of the integrated portion
- wherein the optical fiber bundles are respectively configured with an incidence end disposed adjacent to one of the light emitting devices, and
- wherein all of the optical fibers consisted in optical fiber bundles are bundled at an exit end as one output optical fiber bundle.

2. The optical fiber bundle according to claim 1, wherein the integrated portion has, in a longitudinal sectional plane along a center axis of the optical fiber bundle, a lateral side thereof formed, in a shape of arc radially outwardly convex with respect to a straight line interconnecting an end point at a front end face side of the integrated portion and an end point at a rear end side thereof, to locate at a radially inner side with respect to an extension toward the integrated portion of a line constituting an outline of a portion else than the integrated portion of the optical fiber bundle.

3. The optical fiber bundle according to claim 2, wherein the integrated portion has a front end face thereof as a curved plane.

4. The optical fiber bundle according to claim 1, wherein the integrated portion has a first tapered surface having a decreasing outside diameter as the first tapered surface extends toward a front end thereof, and a second tapered surface connected with the front end of the first tapered surface, the second tapered surface having a decreasing outside diameter as the second tapered surface extends toward a front end thereof, and an angle the first tapered surface makes with a center axis of the optical fiber bundle is smaller than an angle the second tapered surface makes with the center axis.

5. The optical fiber bundle according to claim 1, wherein the integrated portion has, in a longitudinal sectional plane along a center axis of the optical fiber bundle, a lateral side thereof formed, substantially in an S shape comprising a first arc radially outwardly convex with respect to a straight line interconnecting an end point at a front end face side of the integrated portion and an end point at a rear end side thereof, and a second arc radially inwardly convex with respect to the straight line, to locate at a radially inner side with respect to an extension toward the integrated portion of a line constituting an outline of a portion else than the integrated portion of the optical fiber bundle.

6. The optical fiber bundle according to claim 1, wherein the integrated portion has a front end face thereof as a flat plane.

7. An optical irradiator comprising:
- light emitting devices configured for emission of light;
- first optical fiber bundle respectively configured with an incidence end disposed adjacent to one of the light emitting devices, for propagation of light incoming from the light emitting devices to the incidence end corresponding thereto, all of the optical fibers consisted in the optical fiber bundles are bundled at an exit end as one second optical fiber bundle;
- an output section provided to an end portion at the exit end of the second optical fiber bundle, and configured to collect light from the light emitting devices as propagated by the first and second optical fiber bundles to externally output; and
- a heat radiator joined to the light emitting devices, and configured to take therein flux of heat dissipated from the light emitting devices to radiate,
- wherein the first optical fiber bundles respectively comprising a bundle of optical fibers, the optical fibers having distal ends thereof integrated together as an integrated portion, the optical fibers each comprise a core made of glass, and a coating configured to clad the core, the coating is made of resin having a smaller refractive index than the core, the integrated portion is formed by a fusion integration of distal ends of terminal-stripped cores exposed by removing the coatings of the optical fibers and a glass pipe filled up with the terminal-stripped cores of the optical fibers, the terminal-stripped cores of the optical fibers and the glass pipe are completely integrated in the integrated portion, the integrated portion being formed in a partial conical shape having a decreasing outside diameter as the integrated portion extends toward a front end thereof so as to make smaller the angle of incidence than the incidence an le to the front end face of the integrated portion by the internal reflection of a side surface of the integrated portion.

8. The optical irradiator according to claim 7, wherein the integrated portion has, in a longitudinal sectional plane along a center axis of the optical fiber bundle, a lateral side thereof formed, in a shape of arc radially outwardly convex with respect to a straight line interconnecting an end point at a front end face side of the integrated portion and an end point at a rear end side thereof, to locate at a radially inner side with respect to an extension toward the integrated portion of a line constituting an outline of a portion else than the integrated portion of the optical fiber bundle.

9. The optical irradiator according to claim 8, further comprising a blower configured to send a blast of cooling air to the heat radiator.

10. The optical irradiator according to claim 8, wherein the second optical fiber bundle has an end portion at an exit end thereof outlined in a shape corresponding to a shape of a target region to be irradiated with light.

11. The optical irradiator according to claim 8, wherein the light emitting devices each comprise an ultraviolet light emitting diode configured for emission of ultraviolet rays.

12. The optical irradiator according to claim 7, wherein the integrated portion has a first tapered surface having a decreasing outside diameter as the first tapered surface extends toward a front end thereof, and a second tapered surface connected with the front end of the first tapered surface, the second tapered surface having a decreasing outside diameter as the second tapered surface extends toward a front end thereof, and an angle the first tapered surface makes with a center axis of the optical fiber bundle is smaller than an angle the second tapered surface makes with the center axis.

13. The optical irradiator according to claim 7, wherein the integrated portion has, in a longitudinal sectional plane along a center axis of the optical fiber bundle, a lateral side thereof formed, substantially in an S shape comprising a first arc radially outwardly convex with respect to a straight line interconnecting an end point at a front end face side of the integrated portion and an end point at a rear end side thereof, and a second arc radially inwardly convex with respect to the straight line, to locate at a radially inner side with respect to an extension toward the integrated portion of a line constituting an outline of a portion else than the integrated portion of the optical fiber bundle.

14. Optical fiber bundles for an optical irradiator, the optical irradiator, the optical irradiator comprising light emitting devices configured for emission of light, the optical fiber bundles respectively configured with an incidence end, for propagating light incoming from the light emitting devices to the incidence end corresponding thereto, the output optical fiber bundle having an end portion at exit end providing output section of the optical irradiator, the optical irradiator configured to collect light from the light emitting devices as propagated by the fiber bundles to externally output said collected light; the optical fiber bundles respectively comprising;

a bundle of optical fibers, the optical fibers having distal ends thereof integrated together as an integrated portion, the optical, fibers each comprising a core made of glass, a cladding configured to clad the core, the cladding is made of glass having a smaller refractive index than the core, and a coating configured to cover the cladding, the coating made of resin, the integrated portion formed by a fusion integration of distal ends of terminal-stripped claddings exposed by removing the coatings of the optical fibers, the cores clad in the claddings; and a glass pipe filled up with the terminal-stripped claddings of the optical fibers, wherein the terminal-stripped claddings of the optical fibers and the glass pipe are completely integrated in the integrated portion, and wherein the integrated portion. being formed in a partial conical shape having a decreasing outside diameter as the integrated portion extends toward a front end thereof so as to make smaller the angle of incidence the than the incident angle to the front end face of the integrated portion by the internal reflection of a side surface of the integrated portion wherein the optical fiber bundles respectively configured with an incidence end disposed adjacent to one of the light emitting devices, and wherein all of the optical fibers consisted in optical fiber bundles are bundled at an exit end as one output optical fiber bundle, the output optical fiber bundle has an end portion at exit end providing output section of the optical irradiator.

15. The optical fiber bundle according to claim 14, wherein the integrated portion has, in a longitudinal sectional plane along a center axis of the optical fiber bundle, a lateral side thereof formed, in a shape of arc radially outwardly convex with respect to a straight line interconnecting an end point at a front end face side of the integrated portion and an end point at a rear end side thereof, to locate at a radially inner side with respect to an extension toward the integrated portion of a line constituting an outline of a portion else than the integrated portion of the optical fiber bundle.

16. The optical fiber bundle according to claim 14, wherein the integrated portion has a first tapered surface having a decreasing outside diameter as the first tapered surface extends toward a front end thereof, and a second tapered surface connected with the front end of the first tapered surface, the second tapered surface having a decreasing outside diameter as the second tapered surface extends toward a front end thereof, and an angle the first tapered surface makes with a center axis of the optical fiber bundle is smaller than an angle the second tapered surface makes with the center axis.

17. The optical fiber bundle according to claim 14, wherein the integrated portion has, in a longitudinal sectional plane along a center axis of the optical fiber bundle, a lateral side thereof formed, substantially in an S shape comprising a first arc radially outwardly convex with respect to a straight line interconnecting an end point at a front end face side of the integrated portion and an end point at a rear end side thereof, and a second arc radially inwardly convex with respect to the straight line, to locate at a radially inner side with respect to an extension toward the integrated portion of a line constituting an outline of a portion else than the integrated portion of the optical fiber bundle.

18. The optical fiber bundle according to claim 14, wherein the 5 integrated portion has a front end face thereof as a flat plane.

19. The optical fiber bundle according to claim 14, wherein the integrated portion has a front end face thereof as a curved plane.

20. An optical irradiator comprising:

light emitting devices configured for emission of light;

first optical fiber bundles respectively configured with an incidence end disposed adjacent to one of the light emitting devices, for propagation of light incoming from the light emitting devices to the incidence end corresponding thereto, all of the optical fibers consisted in the optical fiber bundles are bundled at an exit end as one second optical fiber bundle;

an output section provided to an end portion at the exit end of the second optical fiber bundle, and configured to collect light from the light emitting devices as propagated by the plurality of optical fibers to externally output; and a heat radiator joined to the light emitting devices, and configured to take therein flux of heat dissipated from the light emitting devices to radiate, wherein the first optical fiber bundles respectively comprising a bundle of optical fibers, the optical fibers having distal ends thereof integrated together as an integrated portion, the optical fibers each comprise a core made of glass, a cladding configured to clad the core, the cladding is made of glass having a smaller refractive index than the core, and a coating configured to cover the cladding, the coating is made of resin, the integrated portion is formed by a fusion integration of distal ends of terminal-stripped claddings exposed by removing the coatings of the optical fibers, the cores clad in the claddings, and a glass pipe filled up with the terminal-stripped claddings of the optical fibers, the terminal-stripped claddings of the optical fibers and the glass pipe are completely integrated in the integrated portion, the integrated portion being formed in a partial conical shape having a decreasing outside diameter as the integrated portion extends toward a front end thereof so as to make smaller the angle of incidence that the incidence angle to the front end face of the integrated portion by the internal reflection of a side surface of the integrated portion.

21. The optical irradiator according to 20, wherein the integrated portion has, in a longitudinal sectional plane along a center axis of the optical fiber bundle, a lateral side thereof formed, in a shape of arc radially outwardly convex with respect to a straight line interconnecting an end point at a front end face side of the integrated portion and an end point at a rear end side thereof, to locate at a radially inner side with respect to an extension toward the integrated portion of a line constituting an outline of a portion else than the integrated portion of the optical fiber bundle.

22. The optical irradiator according to claim 21, further comprising a blower configured to send a blast of cooling air to the heat radiator.

23. The optical irradiator according to claim 21, wherein the second optical fiber bundle has an end portion at an exit end thereof outlined in a shape corresponding to a shape of a target region to be irradiated with light.

24. The optical irradiator according to claim 21, wherein the light emitting devices each comprise an ultraviolet light emitting diode configured for emission of ultraviolet rays.

25. The optical irradiator according to claim 20, wherein the integrated portion has a first tapered surface having a decreasing outside diameter as the first tapered surface extends toward a front end thereof, and a second tapered surface connected with the front end of the first tapered surface, the second tapered surface having a decreasing outside diameter as the second tapered surface extends toward a front end thereof, and an angle the first tapered surface makes with a center axis of the optical fiber bundle is smaller than an angle the second tapered surface makes with the center axis.

26. The optical irradiator according to claim 20, wherein the integrated portion has, in a longitudinal sectional plane along a center axis of the optical fiber bundle, a lateral side thereof formed, substantially in an S shape comprising a first arc radially outwardly convex with respect to a straight line interconnecting an end point at a front end face side of the integrated portion and an end point at a rear end side thereof, and a second arc radially inwardly convex with respect to the straight line, to locate at a radially inner side with respect to an extension toward the integrated portion of a line constituting an outline of a portion else than the integrated portion of the optical fiber bundle.

* * * * *